United States Patent
Newport

(10) Patent No.: US 7,987,199 B2
(45) Date of Patent: Jul. 26, 2011

(54) DYNAMIC ENTERPRISE JAVABEANS

(75) Inventor: William T. Newport, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1646 days.

(21) Appl. No.: 11/068,263

(22) Filed: Feb. 28, 2005

(65) Prior Publication Data

US 2006/0195471 A1    Aug. 31, 2006

(51) Int. Cl.
*G06F 17/30* (2006.01)
(52) U.S. Cl. .................................................. 707/791
(58) Field of Classification Search ............. 707/791, 707/790

See application file for complete search history.

(56) References Cited

U.S. PATENT DOCUMENTS

| | | | |
|---|---|---|---|
| 2002/0104071 A1* | 8/2002 | Charisius et al. | 717/109 |
| 2005/0166209 A1* | 7/2005 | Merrick et al. | 719/310 |

OTHER PUBLICATIONS

Linda G. DeMichiel, "Enterprise JaveBeans™ Specification, Version 2.1," Sun Microsystems, Nov. 12, 2003.

* cited by examiner

*Primary Examiner* — Hosain T Alam
*Assistant Examiner* — Johnese Johnson
(74) *Attorney, Agent, or Firm* — Wood, Herron & Evans, LLP

(57) ABSTRACT

An apparatus, program product and method utilize dynamic EJB's capable of being dynamically reconfigured in a runtime environment. An EJB may be dynamically instantiated in a runtime container during execution of an EJB application that uses the EJB. Moreover, a deployment descriptor associated with an EJB may be parameterized such that at least one descriptor element in the deployment descriptor identifies a variable in a value field therefor. Then, when the deployment descriptor is parsed during instantiation of the EJB, the value for the variable may be determined, and the EJB instantiated using the determined value for the variable as the value for the descriptor element. By doing so, information that is not known at development time can be provided when the EJB is being instantiated.

25 Claims, 3 Drawing Sheets

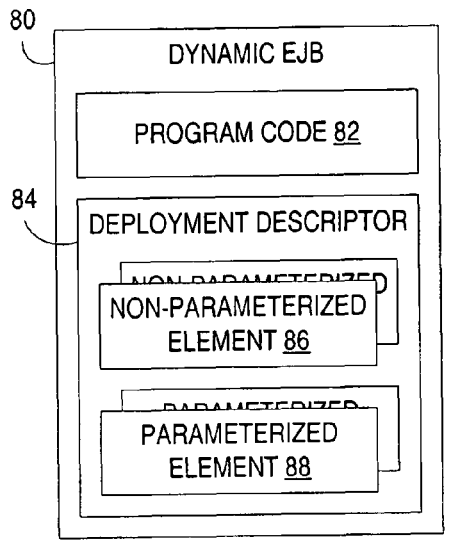
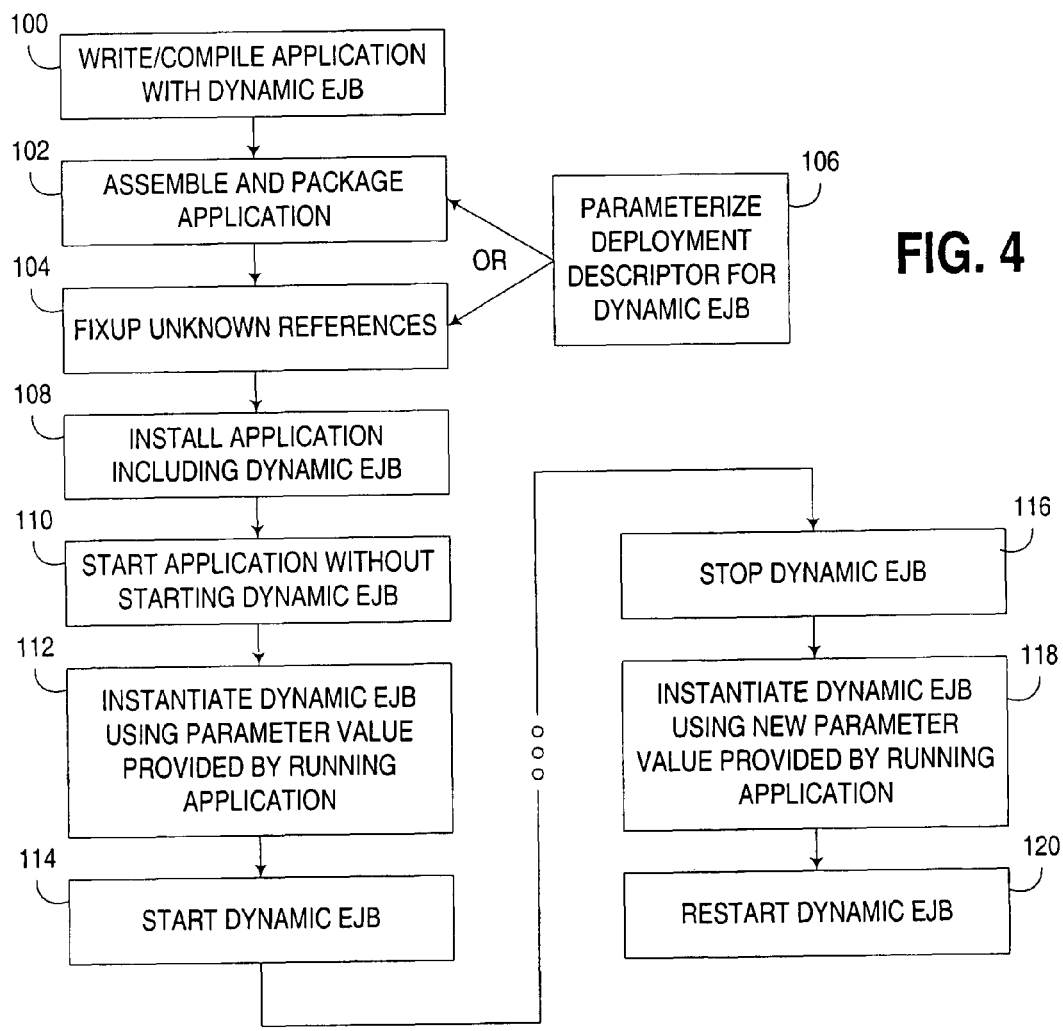
FIG. 3
FIG. 4

DYNAMIC ENTERPRISE JAVABEANS

FIELD OF THE INVENTION

The invention is generally directed to component based computer software, and in particular, to the deployment of component based computer software in an execution environment.

BACKGROUND OF THE INVENTION

Component based computer architectures utilize modular pieces of software, referred to as components, which are assembled together to construct more complex software applications. Through reuse of existing components, software developers often can construct applications in a faster and more effortless fashion than would otherwise occur were the functionality of the existing components required to be written from scratch.

For example, the Java 2 Platform, Enterprise Edition (J2EE) is an open and standard based platform for developing, deploying and managing n-tier, Web-enabled, server-centric, and component-based enterprise applications. Within this environment the principal software components are referred to as Enterprise JavaBeans (EJB), of which there are three primary types: entity beans, session beans, and message-driven beans.

EJB's are typically hosted in runtime environments referred to as containers, e.g., as provided in an application server, and are linked together to construct enterprise class applications.

Deployment of an EJB in a runtime environment traditionally requires a number of steps. First, the EJB is written by a software developer using any of a number of different software programming techniques, and compiled into an intermediate form of program code referred to as bytecode. This bytecode is packaged into an enterprise archive file, also referred to as an EAR file.

In addition, an EAR file typically includes a deployment descriptor, which is generated either manually by a developer or automatically by a programming tool. The deployment descriptor provides additional information for an EJB that assists with the installation and execution of the EJB in the intended runtime environment. Typically, a deployment descriptor takes the form of an XML document, which is parsed during installation of an EJB.

In some instances, a deployment descriptor as created by a developer will lack some information that is needed for installation. For example, an EJB may be designed to interact with some other component during execution, but certain information about the other component may not be known at development time. An EJB such as a message driven EJB (MDB), for instance, often needs to be provided with the name of a message queue before the MDB is capable of receiving messages from that queue during execution. As a result, one step that may be required during installation of an EJB is to manually edit a deployment descriptor to insert any omitted information. Installation of the EJB can then be performed in the same manner as if all of the necessary information was provided in the original deployment descriptor.

One drawback associated with conventional EJB's, however, is that the EJB's are essentially static in nature. Specifically, once an EJB has been installed in a runtime environment, many of the operational characteristics of that EJB cannot be modified without having to reinstall the entire application that uses the EJB. Much of the inflexibility of EJB's in this regard stems from the essentially static nature of the deployment descriptors used to instantiate such components, and the runtime environment within which the EJB's exist. As noted above, installation of an EJB involves parsing of a deployment descriptor during the installation process. Moreover, the EJB is immediately instantiated and activated once installation is complete. As a result, the EJB effectively becomes immutable once installation is complete.

It has been found, however, that some runtime environments may not be as static as the EJB's installed therein. For example, new messaging systems or other back-end services may be installed in a runtime environment, necessitating that EJB's be reconfigured to work with these new services. As another example, existing services may be modified, e.g., where an existing messaging system adds or removes event types that must be recognized by any EJB that listens to the messaging system.

Traditionally, any changes to the runtime environment that require changes in an EJB require that the entire application that uses the EJB to be modified and redeployed. This requirement, however, is excessively burdensome in many instances, and as a result, presents a significant limitation with respect to more complex enterprise applications.

SUMMARY OF THE INVENTION

The invention addresses these and other problems associated with the prior art in providing an apparatus, program product and method that utilize dynamic EJB's capable of being dynamically reconfigured in a runtime environment, typically without requiring redeployment of any applications incorporating such EJB's.

In particular, consistent with one aspect of the invention, an EJB may be dynamically instantiated in a runtime container during execution of an EJB application that uses the EJB. Consistent with another aspect of the invention, a deployment descriptor associated with an EJB may be parameterized such that at least one descriptor element in the deployment descriptor identifies a variable in a value field therefor. Then, when the deployment descriptor is parsed during instantiation of the EJB, the value for the variable may be determined, and the EJB instantiated using the determined value for the variable as the value for the descriptor element. In this manner, information that is not known at development time can be provided when the EJB is being instantiated.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 3 is a block diagram of exemplary data structure implementation of a dynamic EJB in the application server architecture of FIG. 1.

FIG. 4 is a flowchart illustrating steps involved in deploying a dynamic EJB in the application server architecture of FIG. 1.

DETAILED DESCRIPTION

The embodiments described hereinafter utilize dynamic EJB's that are capable of being dynamically instantiated, destroyed and/or reinstantiated using information known at runtime. Typically, such operations are initiated by an EJB application that uses such dynamic EJB's, with the EJB application providing information that is used in the instantiation of a dynamic EJB, but that was not known at the time of development of such an EJB.

Figure 1:
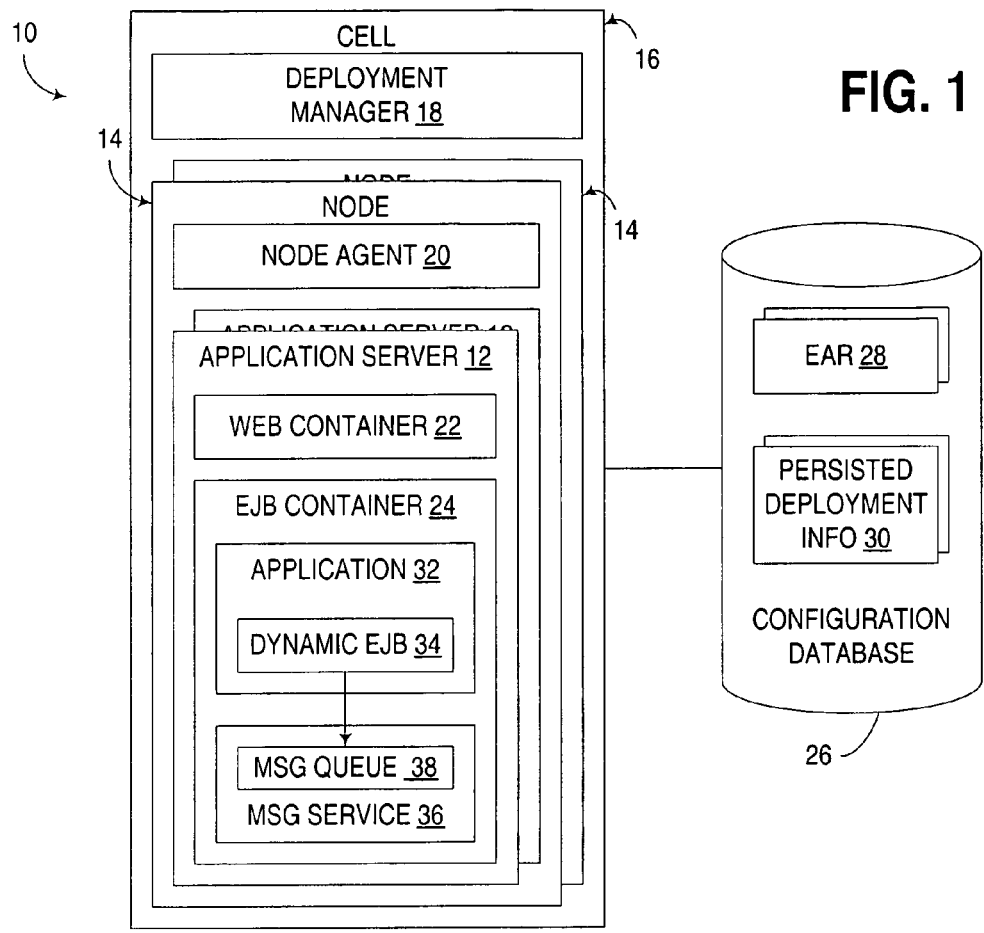
FIG. 1 is a block diagram of an application server architecture utilizing dynamic EJB's consistent with the invention.

Turning to the Drawings, wherein like numbers denote like parts throughout the several views, FIG. 1 illustrates an exemplary application server architecture 10 suitable for implementing dynamic EJB's in a manner consistent with the invention. FIG. 1, in particular, illustrates a WebSphere-based application server architecture developed by International Business Machines Corporation, the assignee of the instant application. In this architecture, a set of application servers 12 are logically arranged into a plurality of nodes 14, which are further logically arranged into one or more cells 16. A node 14 typically resides on a single physical computer, although multiple nodes may reside on the same physical computer. Furthermore, a cell 16 is a logical construct that groups together all application servers 12 managed by the same deployment manager 18, which communicates with node agents 20, resident on each node, for performing administrative tasks on each node.

Each application server 12 represents a process resident on a node and used to execute one or more applications, e.g., as may be installed within various runtime containers such as a web container 22 and an Enterprise Java Bean (EJB) container 24. Moreover, the applications hosted by each application server 12 may be clustered to provide clustered services with load balancing and/or failover capabilities.

A configuration database 26, accessible to each node in a cell, and optionally replicated or distributed for access by multiple nodes, includes, among other information, one or more Enterprise Archive (EAR) files 28, as well as persisted deployment information 30. Each EAR file 28 typically incorporates multiple EJB's, and is used to install an application, e.g., one of applications 32, in EJB container 24 in an application server 12 runtime environment. As will become more apparent below, an EAR file 28 may be used to define one or more dynamic EJB's used by an application, e.g., dynamic EJB 34 shown in EJB container 24. As such, each EAR file 28 may include a parameterized deployment descriptor that provides configuration information used during dynamic instantiation of EJB 34.

Persisted deployment information 30 represents information that enables an EJB or other component to be reinstantiated whenever an application server fails and needs to be restarted. As will become more apparent below, for dynamic EJB's, information 30 may include parameter values used to instantiate dynamic EJB'S, to enable such EJB's to be reinstantiated in a runtime container in the event of an application server failure and restart.

For example, in one illustrative embodiment EJB 34 may be implemented as a message driven EJB (MDB), which typically is required to possess the name of a message queue in order to listen for messages directed to that queue. As such, during instantiation of EJB 34, a parameter value may be provided by EJB application 32 to link EJB 34 to a message queue 38 defined in a message service 36. Furthermore, this value may be persisted as persisted deployment information 30 should it be desirable to enable the EJB to be dynamically reinstantiated in response to a server failure.

Figure 2:
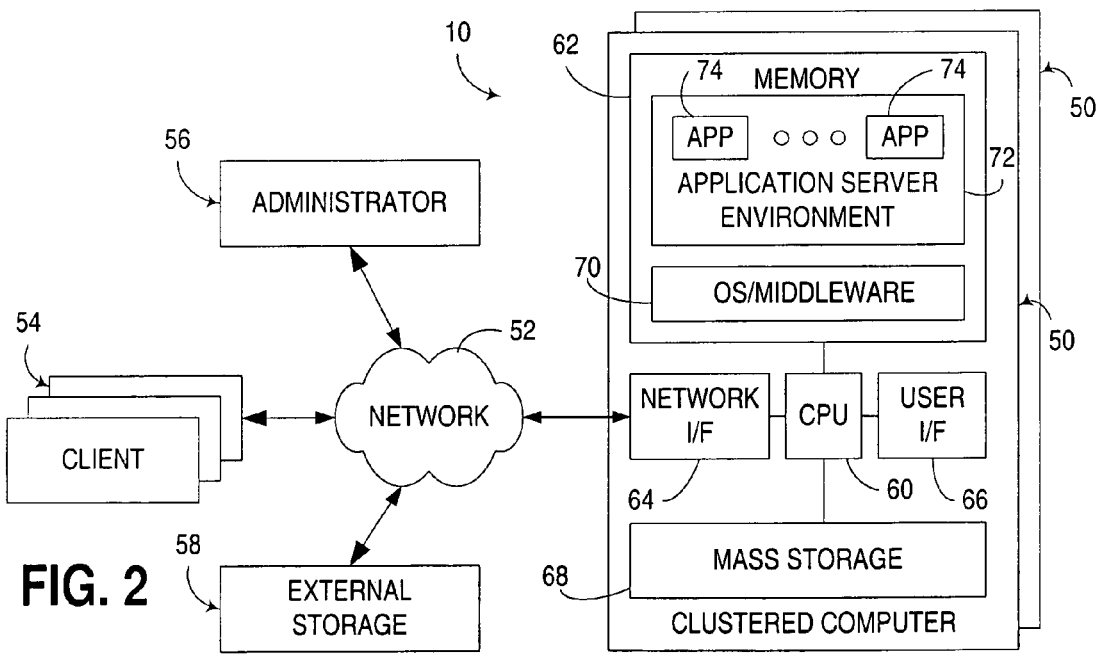
FIG. 2 is a block diagram of an exemplary hardware implementation of the application server architecture of FIG. 1.

The manner in which application server architecture 10 may be implemented in hardware may vary in different implementations. For example, FIG. 2 illustrates on exemplary implementation of architecture 10, incorporating a plurality of clustered computers 50 interfaced with one another via a network 52. As will be appreciated in the art, network 52 may be implemented using any combination of LAN's, WAN's, point-to-point interconnects, and/or various other networking topologies. Furthermore, network 52 may represent multiple distinct networks in some embodiments. Computers 50 may be located in close geographical proximity with one another, or may be geographically dispersed.

Also illustrated as coupled to network 52 are a plurality of client computers 54, which may be connected to clustered computers 50 via private and/or public networks such as the Internet to perform tasks using the application server architecture described herein. For administration purposes, one or more administrator computers 56 may also be coupled to network 52. In addition, it will be appreciated that various other types of components may be coupled to network 52, e.g., external storage 58 such as a storage area network, network addressed storage, or various other persistent storage systems known in the art.

Each computer 50 generically represents, for example, any of a number of multi-user computers such as a network server, a midrange computer, a mainframe computer, etc. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like).

Each computer 50 generally includes a central processing unit (CPU) 60 including one or more system processors and coupled to a memory or main storage 62, typically through one or more levels of cache memory (not shown). Furthermore, CPU 60 may be coupled to additional peripheral components, e.g., one or more networks 52 via a network interface 64, various input/output devices (e.g., a control panel, display, keyboard, mouse and/or dedicated workstation, etc.) via a user interface 66, and mass storage 68 (e.g., a DASD or one or more disk drives). Any number of alternate computer architectures may be used in the alternative.

Each computer 50 is further configured to host a number of levels of software suitable for implementing a distributed computer environment. Shown resident in memory 62 is operating system and/or middleware program code 70, as well as application server environment program code 72, e.g., the aforementioned WebSphere-based architecture, within which reside one or more applications 74.

The discussion hereinafter will focus on the specific routines utilized to implement the above-described EJB architecture. The routines executed to implement the embodiments of the invention, whether implemented as part of an operating system or a specific application, component, program, object, module or sequence of instructions, will also be referred to herein as "computer program code," or simply "program code." The computer program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Now turning to FIG. 3, an exemplary data structure implementation of a dynamic EJB 80 is illustrated in greater detail, including program code 82 and a deployment descriptor 84. Data structure 80 may be disposed, for example, in an EAR file or other archive, or may be stored in another format. For example, data structure 80 may be implemented as an installed template that is used to instantiate a dynamic EJB in a runtime container. It will also be appreciated that a dynamic EJB may be represented using different data structures at different points of development and/or deployment. Program code 82, for example, may represent Java source code or compiled program code, e.g., Java bytecodes and/or native code.

Deployment descriptor 84 typically includes deployment or configuration information for one or more EJB's. In the illustrated embodiment, descriptor 84 includes a plurality of descriptor elements, each storing one or more relevant data values. In many instances, such descriptor elements may be non-parameterized elements 86, whereby specific values are embedded in each such element. For a dynamic EJB, however, one or more descriptor elements are implemented as parameterized elements 88, whereby certain information that is typically unknown at development time is represented by one or more variables that function as placeholders for data values that are provided at runtime, and in connection with instantiation of a dynamic EJB.

Typically, deployment descriptor 84 is implemented as an XML file; however, in some embodiments descriptor 84 may be implemented with other data structures, and may be converted during deployment of a dynamic EJB. For example, a runtime data structure may be created in some embodiments by parsing an XML file representation.

The manner in which a parameterized element 88 may be implemented in a deployment descriptor may vary in different embodiments. For example, in one embodiment, it may be desirable to utilize a standard naming convention, e.g., "% name %" (where name is a variable name, and where conventional escape rules may be used to allow the "%" character to be used in instances where delimiting of a variable name is not intended), to represent a particular variable in an XML deployment descriptor. As an example, Table I below illustrates an exemplary XML deployment descriptor for an MDB, where a descriptor element identified as "<ejb-jar><enterprise-beans><message-driven><message-driven-destination><destination-type>" is parameterized with the variable "% QueueName %":

TABLE I

Sample MDB Parameterized Deployment Descriptor

```
<ejb-jar>
    ...
    <enterprise-beans>
        ...
        <message-driven>
            <description>This is a Sample MDB</description>
            <display-name>Sample Message Driven Bean</display-name>
            <ejb-name>SampleMdb</ejb-name>
            <ejb-class>samplemdb.MdbBean</ejb-class>
            <transaction-type>Container</transaction-type>
            <acknowledge-mode>Auto-acknowledge</acknowledge-mode>
            <message-driven-destination>
                <destination-type>%QueueName%</destination-type>
                <subscription-durability>
                    NonDurable
                </subscription-durability>
            </message-driven-destination>
        </message-driven>
        ...
    </enterprise-beans>
    ...
</ejb-jar>
```

As will become more apparent below, the value for the variable % QueueName % may be provided at runtime by an EJB application whenever it is desirable to instantiate the SampleMdb EJB. It will be appreciated that conventionally, the name of a queue to which a particular MDB will listen is typically not known at development time, and will typically be manually inserted into the XML deployment descriptor by a deployer. In accordance with the principles of the invention, however, parameterization of this descriptor element enables this information to be provided at runtime by a running EJB application, thereby eliminating the need for the deployment descriptor to be fully specified prior to runtime.

It will be appreciated that multiple descriptor elements may be parameterized in a given deployment descriptor, and that other mechanisms for parameterizing configuration information that is utilized in the same nature as a deployment descriptor may be used in the alternative.

FIG. 4 next illustrates the principle steps involved in deploying a dynamic EJB in the application server architecture of FIG. 1. In particular, as shown in block 100, an application is written and compiled by an application developer. As a component of writing and compiling the application, one or more dynamic EJB's are written and/or incorporated from existing libraries of EJB's. Next, in block 102, the application developer assembles and packages the application, e.g., into one or more EAR or other archive files. As a component of assembling the application, one or more deployment descriptors are created, either manually by the developer or in an automated fashion via an appropriate development tool.

Next, in block 104, unknown references in the deployment descriptor(s) for the application are fixed up, typically by a deployer. At this time, other configuration parameters, e.g., relating to the performance capabilities of the ultimate runtime environment, may also be set by the deployer.

As shown in block 106, a deployment descriptor for a dynamic EJB in the application is typically parameterized either during block 102 or 104. As noted above, such parameterization may include, for example, inserting a variable name into the value field for one or more descriptor elements in the deployment descriptor.

Next, in block 108, the application is installed into the runtime environment by the deployer, and in block 110, the application is thereafter started. Were no dynamic EJB incorporated into the application, the starting of the application would typically occur automatically once installation is complete, as each EJB in the application would be fully specified once installed. However, where one or more dynamic EJB's is included, each such dynamic EJB lacks all of the necessary information to enable the EJB to be automatically started with the application. Instead, in the illustrated embodiment, block 108 installs an EJB template, representing that information that is known as of installation time about the EJB, including the program code and any non-parameterized information from the deployment descriptor. However, unlike the remainder of the application, the dynamic EJB is not automatically started in block 110. Instead, as shown in block 112, the EJB template is used to later instantiate the dynamic EJB once the missing information is supplied by the running application. Any number of data structures may be utilized to implement an EJB template consistent with the invention.

Instantiation of a dynamic EJB in block 112 may be initiated by a running application via an API call made to the runtime container. For example, it may be desirable to include a start( ) function call that effectively operates as a constructor for a specified dynamic EJB. In the function call, the application may provide an identifier for the dynamic EJB, as well as one or more parameter values. In one embodiment, the parameter values may be specified via name/value pairs, where the name identifies a particular variable name in a parameterized deployment descriptor or EJB template created therefrom, while the value represents the value to be used for that variable. Given that all of the information necessary to instantiate the dynamic EJB is provided at this point, the dynamic EJB may be instantiated by the runtime container in a similar manner to a static (non-dynamic EJB) during deployment. Next, in block 114, once the dynamic EJB is instantiated, it is automatically started, similar to the manner in which a non-dynamic EJB is started once deployed in a runtime container.

Dynamic EJB's deployed in this manner provide a number of benefits over non-dynamic EJB's, including freeing the deployer in many instances from having to manually modify some deployment descriptors prior to deployment of an application. Furthermore, with appropriate support, an administrator may be able to provide any necessary information for a dynamic EJB through an administrative interface.

Another benefit of dynamic EJB's is that they may be dynamically reconfigurable after an application has been deployed, thereby enabling an application to be reworked to handle changed operational conditions without needing to be redeployed. For example, in the exemplary case of an MDB, a messaging system or other back-end service may be added or changed, e.g., to add a new service, or, in the case of a messaging system, to add new types of events that may be handled by the messaging system. Through dynamic reconfiguration of a dynamic EJB as described herein, however, a dynamic EJB may be effectively modified without requiring redeployment of an application that uses the dynamic EJB.

Specifically, as shown in block 116, it may be desirable to additionally support the ability of an application to dynamically stop a dynamic EJB. For example, it may be desirable to include a stop( ) API call that effectively operates as a destructor for a specified dynamic EJB. Once a dynamic EJB is destroyed, the application may then re-instantiate the dynamic EJB using new parameter values, and start the new instantiation, typically using the same start( ) API call, as shown in blocks 118 and 120.

It will be appreciated that other manners of enabling an application to start, stop, create and/or destroy a dynamic EJB may be used in the alternative. Moreover, it will be appreciated that additional interfaces may be provided to enable an application to manage dynamic EJB's. For example, it may be desirable to provide an enumerate( ) API call that would enable an application to receive status information about dynamic EJB's, e.g., which EJB's are active, what parameter values were used to create such EJB's, whether the EJB's are persisted, etc.

Figure 5:
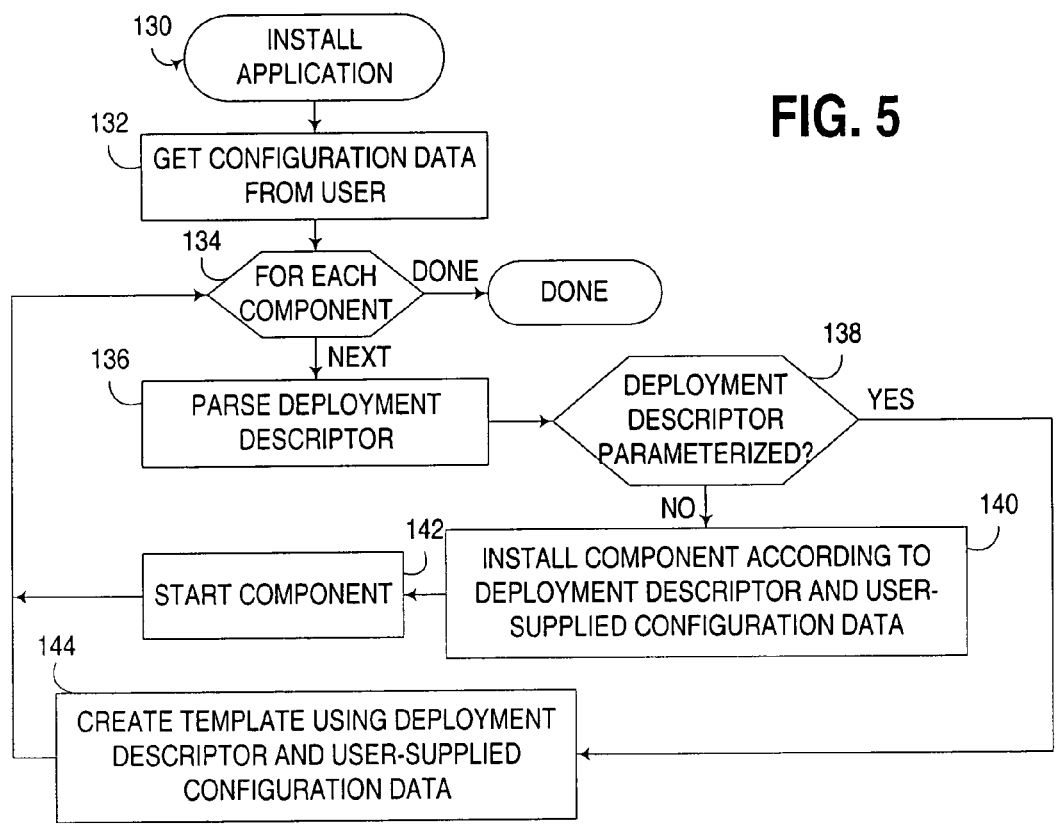
FIG. 5 is a flowchart illustrating an install application routine executed by an application server in the application server architecture of FIG. 1.

FIG. 5 next illustrates a flowchart of an install application routine 130 executed by an application server in the application server architecture of FIG. 1 to install an application, e.g., as described above in block 108 of FIG. 4. Routine 130 begins in block 132 by obtaining any necessary configuration data from the user regarding various installation options, e.g., filename paths, etc. Next, block 134 initiates a FOR loop to process each component incorporated into the application to be installed. For each such component, control passes to block 136 to parse the deployment descriptor associated with that component (or at least the relevant portion of a deployment descriptor, if a deployment descriptor file specifies multiple components). Block 138 then determines whether the deployment descriptor is parameterized (i.e., has one or more descriptor elements that identify a variable name). If not, control passes to block 140 to install the component in a conventional manner, based upon the deployment descriptor and any relevant user-supplied configuration data. Control then passes to block 142 to automatically start the component in a conventional manner. Control then returns to block 134 to process additional components. Once all components are processed, installation of the application is complete.

Returning to block 138, if the deployment descriptor for a component is parameterized, the component is a dynamic EJB, and as such, control passes to block 144 to create an EJB template for the component using the deployment descriptor and any relevant user-supplied configuration data. However, since the dynamic EJB is not fully specified at this point, processing of the dynamic EJB is complete. Control therefore passes to block 134 to process additional components in the application.

Figure 6:
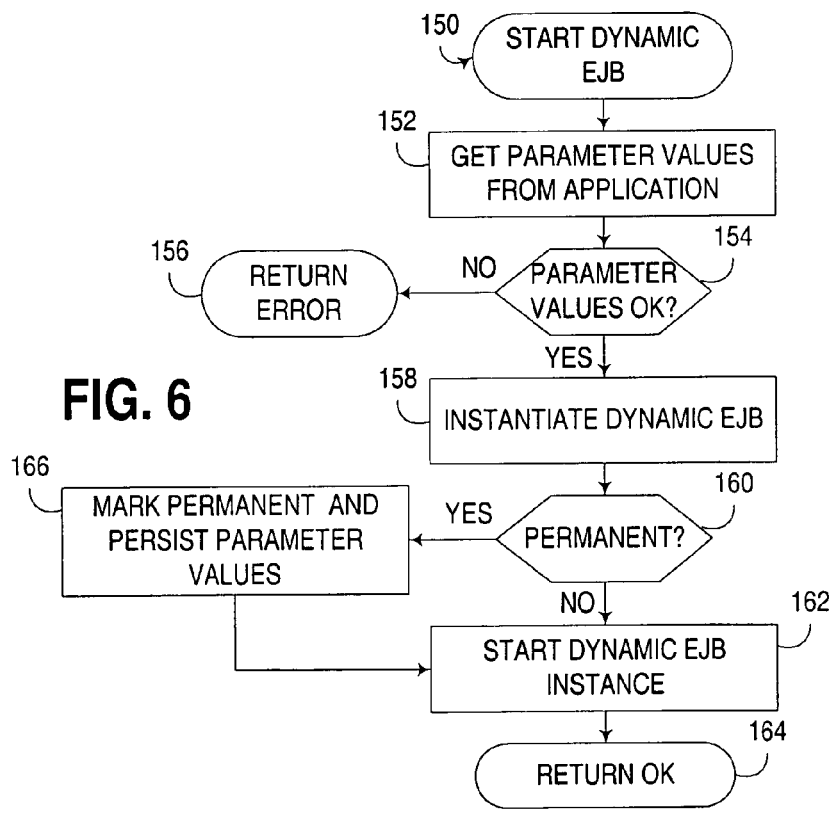
FIG. 6 is a flowchart illustrating a start dynamic EJB routine executed by an application server in the application server architecture of FIG. 1.

FIG. 6 next illustrates a flowchart of a start dynamic EJB routine 150 executed by an application server in the application server architecture of FIG. 1 to start a dynamic EJB, e.g., as described above in blocks 112 and 114 of FIG. 4. Routine 150 begins in block 152 by obtaining any necessary parameter values from the application. Routine 150 is typically initiated in response to an API call from an application, and as such, parameter values received in block 150 are typically provided by the application as arguments to the API call, e.g., in the form of name/value pairs.

Block 154 next determines whether the parameter values are correct, i.e., whether each parameter value matches a variable name for a parameterized descriptor element, whether a parameter value is provided for every parameterized descriptor element for a dynamic EJB, and optionally, whether the parameter value meets any type or value constraints for the descriptor element (e.g., for a parameterized descriptor element that specifies a particular queue or other resource, block 154 may also determine whether the identified resource actually exists).

If any error is detected in block 154, control passes to block 156 to return with an error indication. Otherwise, block 154 passes control to block 158 to instantiate the dynamic EJB using the template and the parameter values provided in the API call. Block 160 then optionally determines whether the deployment descriptor and/or the supplied parameter values specify that the dynamic EJB is intended to be made permanent. In particular, in some embodiments it may be desirable to enable a dynamic EJB to be automatically restarted whenever an application server restarts after a failure. In other instances, however, it may be desirable for a dynamic EJB to not be restarted automatically. As such, by providing an indication of whether to make the dynamic EJB permanent, both types of components may be supported. In other embodiments, all dynamic EJB's may be permanent or non-permanent, and as such, block 160 may be omitted.

If a dynamic EJB is not to be permanent, control passes to block 162 to start the dynamic EJB instance. Control then passes to block 164 to terminate the routine and return an "OK" status, indicating that the dynamic EJB was successfully started. On the other hand, if the dynamic EJB is to be permanent, control passes to block 166 to mark the dynamic EJB as permanent and persist its relevant parameter values. Control then passes to block 162 to start the dynamic EJB and terminate routine 150.

If a dynamic EJB is marked as permanent, upon restart of a failed application server, the dynamic EJB will be automatically restarted in a similar manner to any non-dynamic components, with the principal exception being that persisted parameter values are used to instantiate the dynamic EJB rather than using fully specified deployment descriptors as occurs for non-dynamic components.

Various modifications to the embodiments described herein will be apparent to one of ordinary skill in the art having the benefit of the instant disclosure. Therefore, the invention lies in the claims hereinafter appended.

What is claimed is:

1. A method of instantiating an Enterprise JavaBean (EJB) in a runtime container, the method comprising:
   accessing a deployment descriptor associated with an EJB to be instantiated, wherein the deployment descriptor includes at least one descriptor element configured to have a value associated therewith that is used to instantiate the EJB, and wherein a value field for the descriptor element identifies a variable; and
   after starting an EJB application that uses the EJB in the runtime container, determining a value for the variable and instantiating the EJB using the deployment descriptor, including using the determined value for the variable as the value for the descriptor element.

2. The method of claim 1, wherein the deployment descriptor comprises an XML document.

3. The method of claim 2, wherein the value field for the descriptor element identifies the variable by delimiting a variable name by at least one predetermined character.

4. The method of claim 3, wherein the value field for the descriptor element identifies the variable by delimiting the variable name using % characters disposed before and after the variable name.

5. The method of claim 1, wherein the descriptor element specifies information that is unknown during development of the EJB.

6. A method of deploying an Enterprise JavaBean (EJB) in a runtime container, the method comprising:
   executing an EJB application in the runtime container; and
   while executing the EJB application, dynamically instantiating an EJB used by the EJB application in the runtime container using information that is determined after execution of the EJB application has been initiated.

7. The method of claim 6, wherein dynamically instantiating the EJB comprises:
   accessing a data structure associated with the EJB, wherein the data structure includes at least one descriptor element configured to have a value associated therewith that is used to instantiate the EJB, and wherein a value field for the descriptor element identifies a variable;
   determining a value for the variable; and
   instantiating the EJB using the data structure, including using the determined value for the variable as the value for the descriptor element.

8. The method of claim 7, wherein the data structure comprises a deployment descriptor.

9. The method of claim 7, wherein the descriptor element specifies information that is unknown during development of the EJB.

10. The method of claim 7, wherein determining the value for the variable comprises receiving the value from the EJB application.

11. The method of claim 10, wherein dynamically instantiating the EJB is performed in response to an API call from the EJB application, wherein the value is provided in the API call.

12. The method of claim 10, further comprising, while executing the EJB application:
   dynamically destroying the EJB;
   determining a second value for the variable; and
   dynamically reinstantiating the EJB using the second value.

13. The method of claim 12, wherein dynamically destroying the EJB is performed in response to an API call from the EJB application.

14. The method of claim 7, further comprising:
   persisting the determined value in connection with dynamically instantiating the EJB; and
   dynamically instantiating the EJB using the persisted value during a restart of the runtime container.

15. The method of claim 6, further comprising providing status information associated with the EJB to the EJB application in response to an API call therefrom.

16. A program product, comprising:
   program code configured to execute an Enterprise JavaBean (EJB) application in a runtime container, and, while executing the EJB application, to dynamically instantiate an EJB used by the EJB application in the runtime container using information that is determined after execution of the EJB application has been initiated; and
   a non-transitory recordable computer readable medium bearing the program code.

17. The program product of claim 16, wherein the program code is configured to dynamically instantiate the EJB by:

accessing a data structure associated with the EJB, wherein the data structure includes at least one descriptor element configured to have a value associated therewith that is used to instantiate the EJB, and wherein a value field for the descriptor element identifies a variable;

determining a value for the variable; and instantiating the EJB using the data structure, including using the determined value for the variable as the value for the descriptor element.

18. The program product of claim 17, wherein the data structure comprises a deployment descriptor.

19. The program product of claim 17, wherein the descriptor element specifies information that is unknown during development of the EJB.

20. The program product of claim 17, wherein the program code is configured to determine the value for the variable by receiving the value from the EJB application.

21. The program product of claim 20, wherein the program code is configured to dynamically instantiate the EJB in response to an API call from the EJB application, wherein the value is provided in the API call.

22. The program product of claim 20, wherein the program code is further configured to, while executing the EJB application, dynamically destroy the EJB, determine a second value for the variable, and dynamically reinstantiate the EJB using the second value.

23. The program product of claim 22, wherein the program code is configured to dynamically destroy the EJB in response to an API call from the EJB application.

24. The program product of claim 17, wherein the program code is further configured to persist the determined value in connection with dynamically instantiating the EJB, and dynamically instantiate the EJB using the persisted value during a restart of the runtime container.

25. A program product, comprising:

Enterprise JavaBean (EJB) program code defining a dynamic EJB; a deployment descriptor associated with the EJB program code, the deployment descriptor including at least one descriptor element configured to have a value associated therewith that is used to instantiate the EJB, and wherein a value field for the descriptor element identifies a variable that is resolved only after an EJB application that uses the dynamic EJB has been started in a runtime container; and a non-transitory recordable computer readable medium bearing the EJB program code and deployment descriptor.

\* \* \* \* \*